United States Patent [19]
Finn

[11] Patent Number: 5,206,173
[45] Date of Patent: Apr. 27, 1993

[54] AIR HOOD

[75] Inventor: Larry J. Finn, Gladewater, Tex.

[73] Assignee: Bedminster Bioconversion Corporation, Cherry Hill, N.J.

[21] Appl. No.: 710,450

[22] Filed: Jun. 5, 1991

[51] Int. Cl.$^5$ ............................................. C05F 17/02
[52] U.S. Cl. ........................................ 435/313; 47/17;
47/32.1; 52/199; 435/287; 435/316; 454/185;
454/186; 454/251; 454/252; 454/253
[58] Field of Search .................... 435/287, 313, 316;
454/251, 252, 253, 185, 186; 422/184; 47/17 I,
32.1; 202/233, 234; 52/199

[56] References Cited

U.S. PATENT DOCUMENTS

| | | | |
|---|---|---|---|
| 2,601,905 | 7/1952 | Anderegg | 454/185 |
| 3,741,631 | 6/1973 | Laing | 47/17 I |
| 4,062,770 | 12/1977 | Kneer | 422/184 |
| 4,184,538 | 1/1980 | Rauenhorst | 454/251 |
| 4,301,626 | 11/1981 | Davis et al. | 47/17 I |
| 4,482,633 | 11/1984 | Roediger | 435/316 |
| 4,671,350 | 6/1987 | Toukola | 454/253 |
| 5,116,762 | 5/1992 | Groenenboom | 435/316 |

*Primary Examiner*—Robert J. Warden
*Assistant Examiner*—Timothy M. McMahon
*Attorney, Agent, or Firm*—Stanley H. Zeyher

[57] ABSTRACT

In a composting process, a heat conductive ventilation hood overlying a compost pile undergoing active composting. The hood is shaped so that process air emanating from the pile contacts the undersurface of the hood while ambient outside cool air is caused to traverse the upper surface of the hood. As a result of this heat exchange arrangement process air is dehumidified while concomitantly the ambient air is heated. The hood is pitched to cause condensate to run down its surface and not to drip. Warmed ambient air is used to heat the composting facility and dehumidified process air and condensate is reused in the composting process.

19 Claims, 6 Drawing Sheets

AIR HOOD

FIELD OF THE INVENTION

The present invention relates to an air recovery, heating, odor and humidity control system for use with apparatus for making organic fertilizer, sometimes referred to as compost, or other fermentation products, from organic waste material such as municipal solid waste, sewage sludge, and the like.

BACKGROUND OF THE INVENTION

Prior art systems for achieving composting of solid waste and sewage sludge typically employ one or more multi-stage digesters in which material being treated undergoes staged microbial decomposition. The conventional digester comprises a tube-like structure divided into two or more compartments or stages. During material processing the tube is rotated while air is circulated through the digester at controlled rates under predetermined conditions in a flow direction counter to the material flow. The climate in each stage is maintained to achieve the optimum development of the type and species of microorganism predominant in that stage. Spent air is vented from the digester to the atmosphere as needed to maintain an optimum climate in each of the operating stages. Temperatures are kept below 150 degrees fahrenheit to insure the maximum rate of composting. Moisture content of the material under treatment usually does not require adjustment during this phase of the operation, but if the material becomes too dry for composting, the digester vessel is equipped with a water manifold which allows the addition of moisture to the mass undergoing treatment. Since this phase of the composting is conducted entirely within an enclosed vessel, the only source of odor production is the exhaust air. Typical of such prior art systems and methodology of operation are those set out and described in U.S. Pat. Nos. 3,245,759 and 3,138,447, the teachings of which are hereby incorporated by reference.

The method and apparatus for manufacture of compost described in those patents is designed to produce aerobic decomposition of organic waste materials by maintaining within the apparatus in which the method is carried out, conditions suitable for optimum propagation of the different types of aerobic bacteria on which such decomposition depends. The apparatus as noted above comprises a digester in the form of a cylindrical drum mounted for rotation on an axis which is slightly declined towards the discharge end relative to the horizontal. The interior of the digester is divided into a series of compartments or chambers by a plurality of transverse partitions spaced along the axis of rotation. Each partition is provided with transfer buckets which are selectively opened and which, when opened transfer material from compartment to compartment from the higher to the lower end of the drum, the raw waste organic material being fed into the digester at the higher end and the finished product being withdrawn at the lower end.

Environmental, regulatory and recycling forces have led to a refocusing of disposal options. Landfilling, which currently accounts for approximately 78% of municipal solid waste disposal, is in severe jeopardy. The number of landfills has decreased from 20,000 in 1978 to 6,000 in 1988 and is estimated to decrease to 2,100 by the year 2000. In addition, incineration, which accounts for approximately 11% of municipal solid waste disposal has come under intense public scrutiny. Public opposition has been responsible for the curtailment of a significant number of proposed incineration projects.

The co-composting technology to which the present invention has application embodies a fermentation reactor which is employed to accelerate the microbial conversion of solid waste and sewage sludge into a high quality compost. The process has the ability to compost municipal solid waste and sewage together hence the term co-composting, thus addressing the two principle waste management problems communities will face in the next few decades. Unlike incineration and landfilling, which both generate a number of toxic by-products including harmful emissions of gases, heavy-metal laden ash and leachate, the co-composting process to which this invention relates produces no toxic by-products. Additionally, it is a non-grind, non-shred, in-vessel aerobic process that produces a high quality compost while simultaneously sanitizing non-compostable residual tailings. The process results in municipal solid waste volume reductions as high as 85% while simultaneously providing a solution to the sewage sludge problem. This is extremely important in light of the fact that, based upon current projections, municipal solid waste generation will exceed landfill capacity by approximately 250% by the year 2000.

SUMMARY OF THE INVENTION

It has been discovered that a surprising number of advantages result if the air heretofore exhausted to the atmosphere is retained within the system and reused in critical phases of the fermentation process. By recovering the exhaust air produced by the process operations and reusing it in critical phases of the operation system efficiency of the overall system is improved, pathogen kill is enhanced and odor control is improved.

The heating, air recovery, odor and humidity control system comprising this invention is meant to serve the purpose of taking advantage of the exhaust air produced by the process operations and reusing it in the further operations of the system. The reuse of the process-produced air is a means of limiting the amount of air exhausted into the outside atmosphere, which is of major concern to many environmentalists and concerned citizens. The reuse of the preconditioned air is also a benefit in that external, ambient temperature air is not required for the most important steps in the process, namely, the curing of the compost during the process to further reduce pathogens. During this critical stage it is important that the temperature be maintained at a fairly precise level for the entire period designated by the United States Environmental Protection Agency guidelines in order to achieve the prescribed pathogen destruction. Should external ambient air be used in a cold climate for example, without prior heating and the concomitant expenditure of energy, the time to achieve the correct temperatures for the process would be extended and more of the microbes which are essential to carrying out the process could be damaged prior to reaching the proper temperature level.

It has been discovered that by taking advantage of the exhaust air produced by the process operations and reusing it in the further operations of the system the air exhausted into the atmosphere is substantially deodorized and as noted above, use of the preconditioned air is also a benefit in that external, ambient temperature air is not required for the most important process step of pathogen destruction.

In the typical system utilizing a multi-stage digester for the co-composting of municipal solid waste and sewage sludge the residence time in the digester is normally three days. Upon removal from the digester the material, now compost plus nondegradables, is rough screened by a one-inch trommel. Two fractions emerge from the trommel. One is the residue which fails to pass through the screen. This material is discharged back onto the tipping floor of a typical composting facility and sent to landfill. The rough compost is then conveyed to an area in which further composting or curing is carried out. For purposes of this invention this phase of further processing of the rough compost will be referred to generically as curing. The term curing area as used herein shall mean an area where organic material that has undergone the rapid initial stage of composting is further stabilized into a humus-like material. It is in this stage of the process in which the pathogens primarily undergo destruction. The curing stage of the process is an important phase of the overall system which comprises the subject invention in that it is during the approximately two week stay of the compost in the curing area that the pathogens are destroyed. To accomplish this step of the process the temperature of the compost must be maintained within certain parameters.

By maintaining an essentially closed system in which effluent air from the curing area and digesters is captured for reintroduction and reuse in the system the release of process odors is avoided while at the same time a more efficient and environmentally acceptable process is achieved. It has been found that in cooler climates air emanating from the curing beds, which air is heavily moisture laden condenses upon contact with cooler roof surfaces resulting in severe drippage problems. To alleviate this problem, while at the same time increasing the operating efficiency of the facility, I have discovered that by utilizing a uniquely designed condensation hood installed over the compost pile during curing, that the aforesaid problem is eliminated. Moreover means are provided for achieving a heat exchange relation between the process air emanating from the compost pile and outside air which is channelled over a surface of the hood, thereby both to enhance condensation and warm the outside air to aid in heating the facility.

BRIEF DESCRIPTION OF THE DRAWINGS

For the purpose of illustrating the invention, there is shown in the drawings presently preferred embodiments; it being understood, however, that this invention is not limited to the precise arrangements and instrumentalities shown.

DETAILED DESCRIPTION OF THE INVENTION

Figures 1, 2:
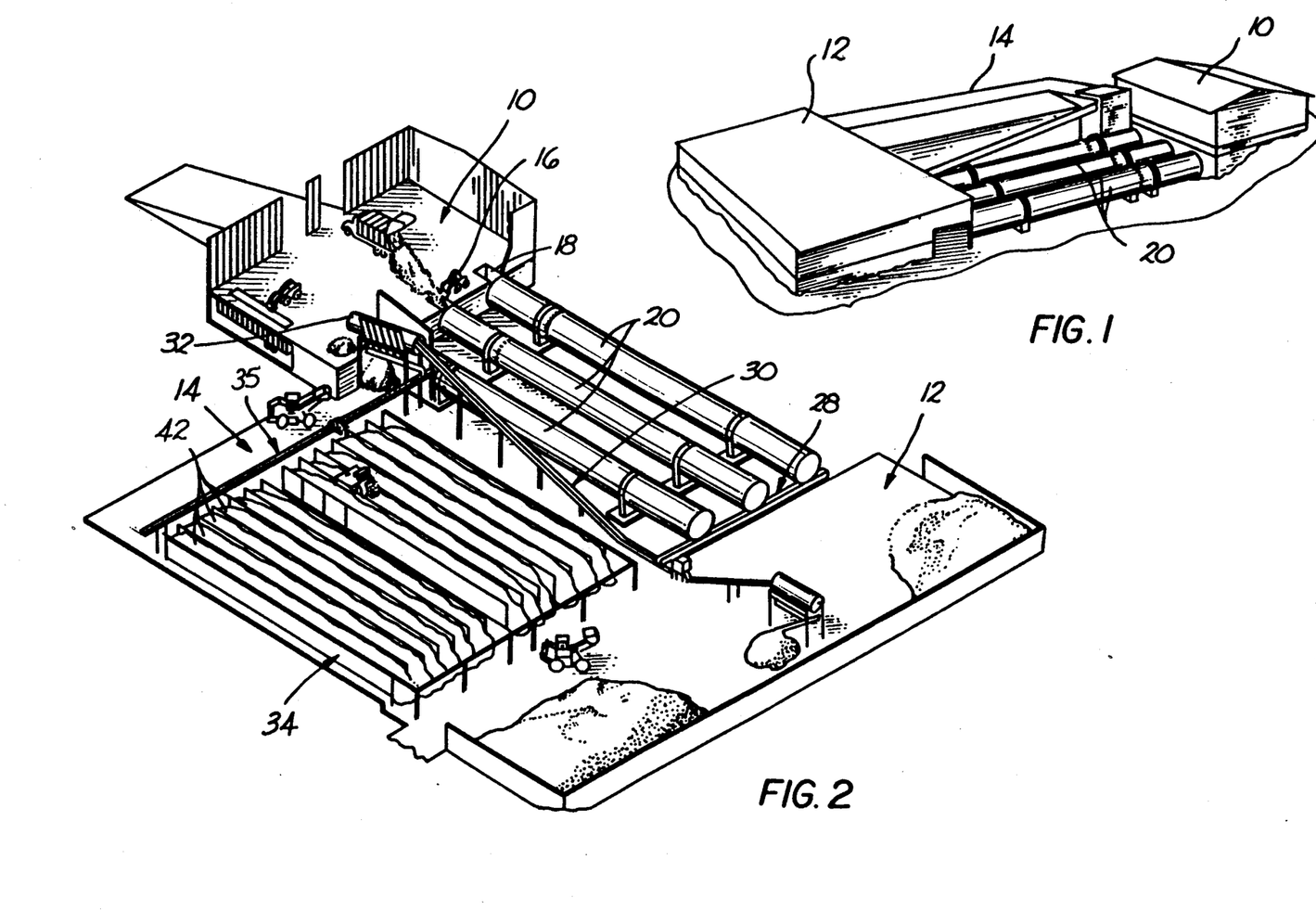
FIG. 1 is an isometric overview of a composting facility embodying the present invention.
FIG. 2 is a plan view of the facility shown in FIG. 1 with portions of the enclosure removed to show the internal construction of the plant.

Referring now to the drawings and more particularly to FIGS. 1 and 2 thereof there is shown a completely enclosed composting facility comprised of three major areas, the tipping building 10, a processing building 12 and an aeration or curing building 14. The tipping building floor is where solid waste is dumped and sorted. Unacceptable waste, for example, white goods, car batteries, tires, large pieces of wood, etc. is rejected and sent to a landfill. As diagrammatically shown in FIG. 2, the acceptable waste is moved by means of an end loader 16 from the tipping floor into ram pits 18, positioned at the entry of the digesters 20. From this position the waste material is loaded directly into the digester drum by means of a hydraulic loading ram. Sewage sludge 22 (FIG. 3) delivered to the plant is stored in a liquid sludge tank 24 from where it is pumped by liquid sludge pumps 26 directly into the digesters 20 as needed to maintain the proper carbon/nitrogen ratio essential to efficient composting.

The sewage sludge is added to the solid waste to bring the moisture content of the overall digester charge up to about 50% and to bring the carbon/nitrogen ratio to 35:1 or less. The material is then processed through the digester for a period of three days. As previously noted, the digester is typically divided into three fermentation chambers or stages by means of internal partitions. Material is discharged from the digester after approximately three days of residence time within the digester. Upon removal from the digester the material, now compost plus non-degradables is transported by belt conveyors 28 and 30 to a trommel screen 32 where it is rough screened into two fractions. One is the residue, a non-degradable material, sometimes hereinafter referred to as inorganic material, which fails to pass through the screen and which is discharged back onto the tipping floor by belt conveyor 33 where it is deposited into a transfer trailer for landfill disposal. The non-degradables which have passed through the digester are sanitary because of the high temperatures encountered in the digester and will not decompose nor produce leachate in the landfill. The second fraction is rough compost, sometimes hereinafter referred to as organic or degradable material, which is conveyed to the curing area 34 by conveyor belt 35.

Figure 3:
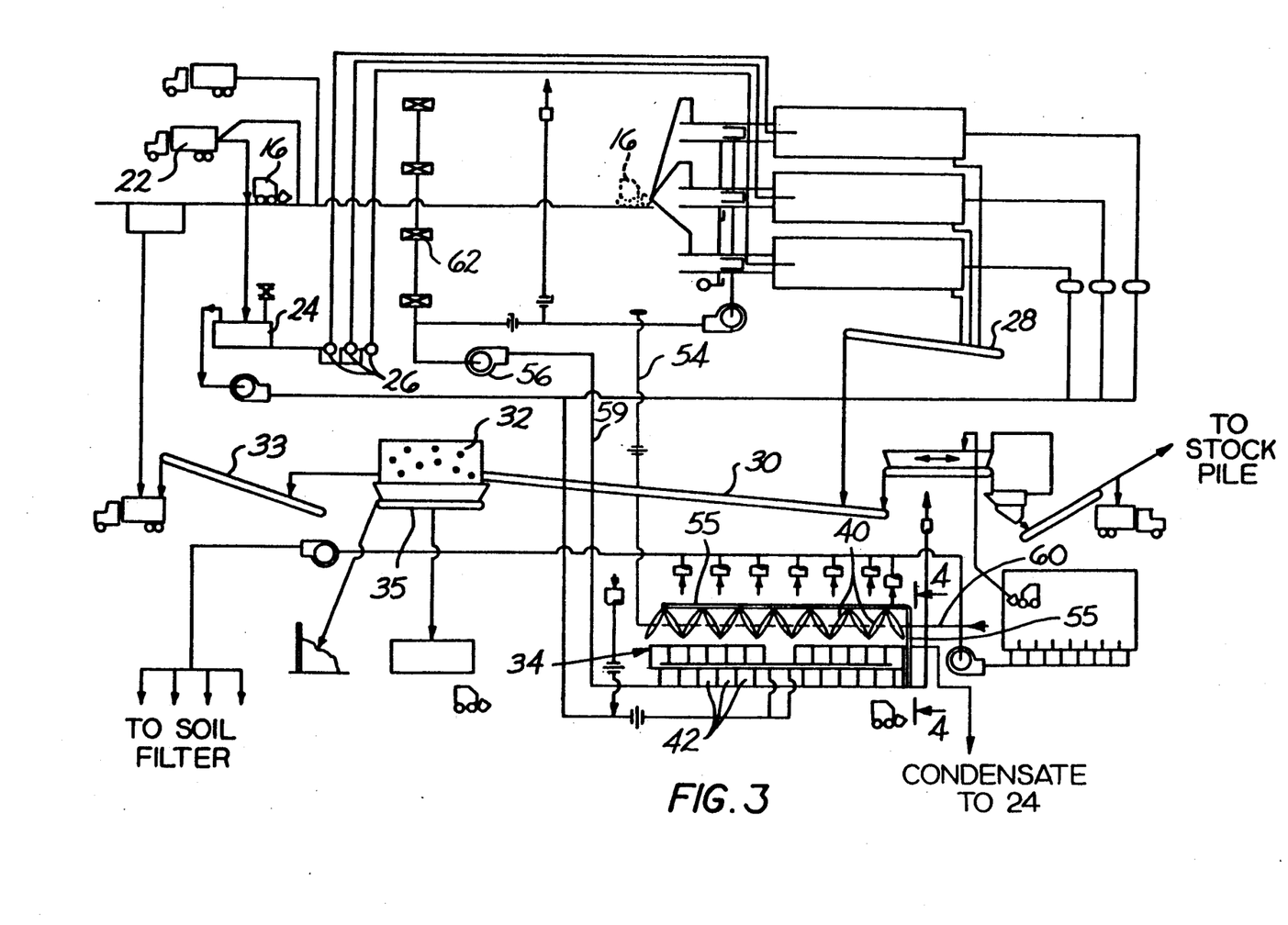
FIG. 3 is a flow diagram of the overall composting facility showing one preferred embodiment of the system comprising this invention.
Figure 5:
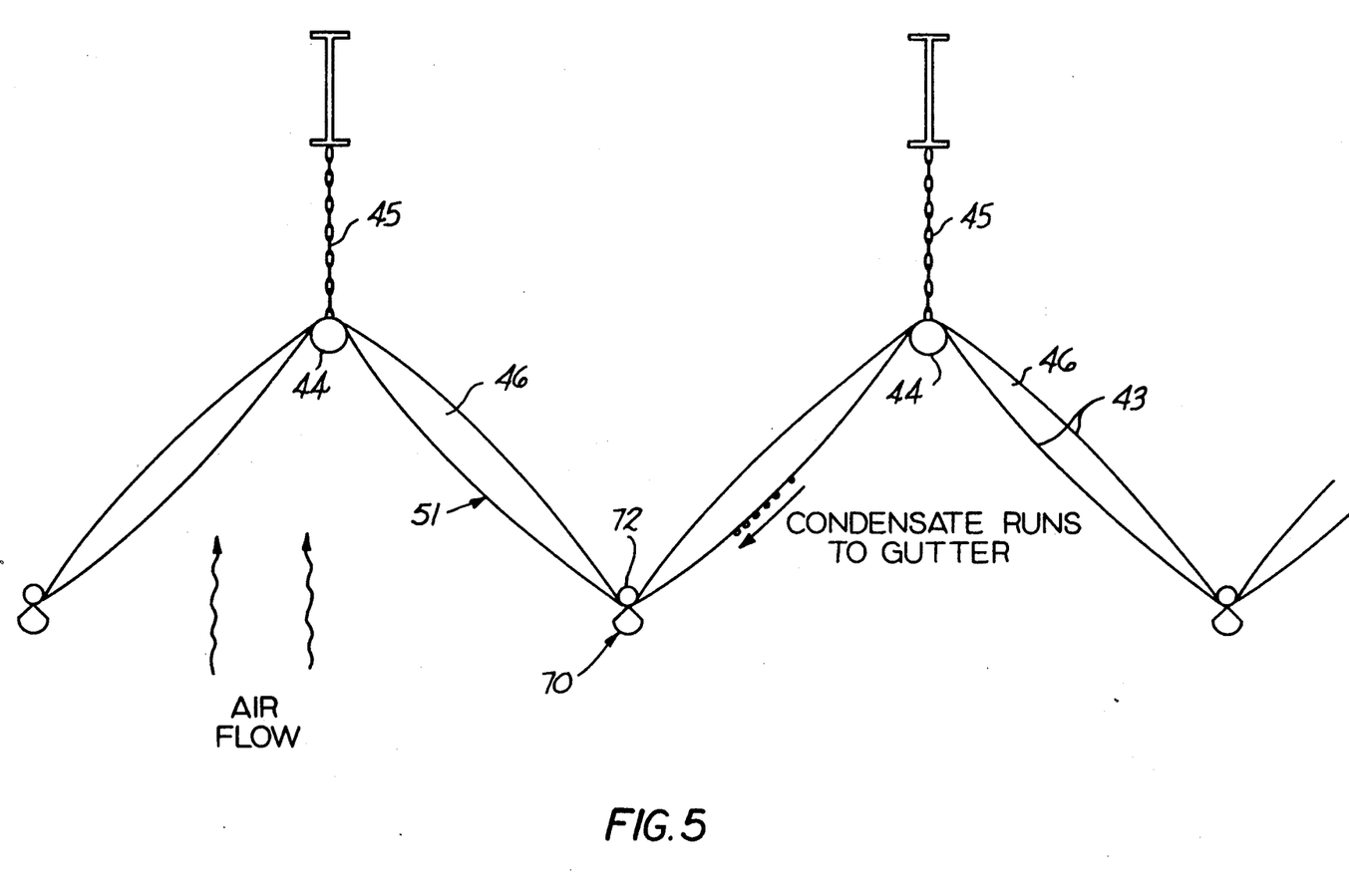
FIG. 5 is an enlarged showing of the air hood construction.

It is in the curing area 34 in which the present invention has particular application. As seen in FIG. 3, a series of tent-like hoods 40, composed of 6 mil. thick polyethylene, or similar material, are positioned in overlying relation to the curing beds or channels 42. The hood material in this embodiment is of two-ply construction with an air gap 46 between plies. As best seen in FIG. 5, the plastic sheet 43 is supported by perforated PVC ducts 44, suspended from the ceiling of the facility by chain hangers 45. The ducts act as ridgepoles for the structure. The tent like configuration thus formed is closed at both ends. The air gap 46 formed by the two ply construction is provided with ducts for ingress and egress of air. Ductwork communicates with piping 44 to provide for desired distribution of collected process air.

Figure 4:
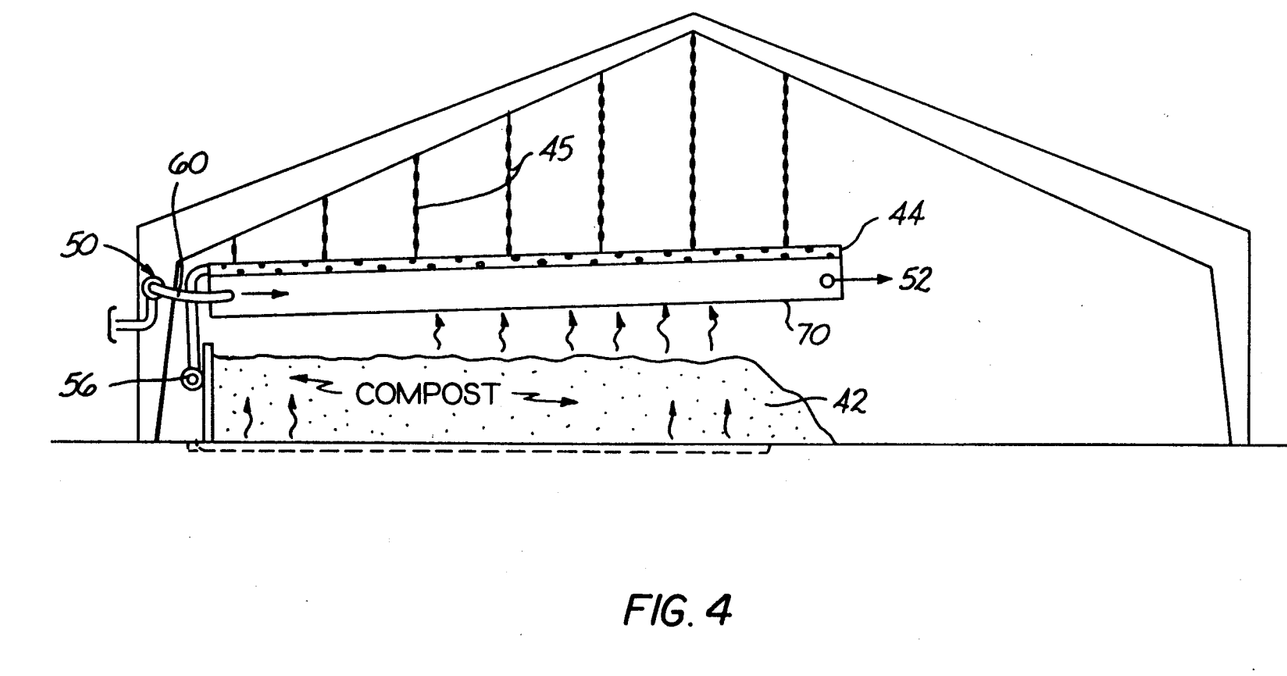
FIG. 4 is a transverse view of the hood arrangement taken along line 4—4 of FIG. 3.

Each air gap is provided with an air blower fan 50, FIG. 4, which forces outside air through the gap in heat exchange relation with process air coming from the compost piles or curing beds 42. As a result of this heat exchange relation heat is transferred from the process air to the outside air as moisture entrained within the process air condenses on the lower surface 51 of the polyethylene sheet confronting the curing bed. Heated outside air exits the gap as shown by arrow 52, in FIG. 4. The heated outside air is directed by ductwork 54 (FIG. 3), to the tipping area 10 to aid in heating the facility. FIG. 4 illustrates one arrangement used to feed cold outside air by means of blower 50 and ductwork 60 to the air gaps 46 at one end of the tent and for collecting at the other end of the tent heated air for distribution to the tipping area 10 by means of duct 54, as schematically illustrated in FIG. 3.

It should be understood in this connection that each of the two-ply air gaps forming each side of the tent-like structure are closed at both ends as, for example, by a heat seal. Cold air blown in at one end through duct 60 keeps the plies separated while the warmed air is drawn out of the air gap through hot-air ducts 54. Each of the main ducts 54 and 60 are connected to the air gaps 46 by means of flexible ducting, not shown.

Figure 6A:
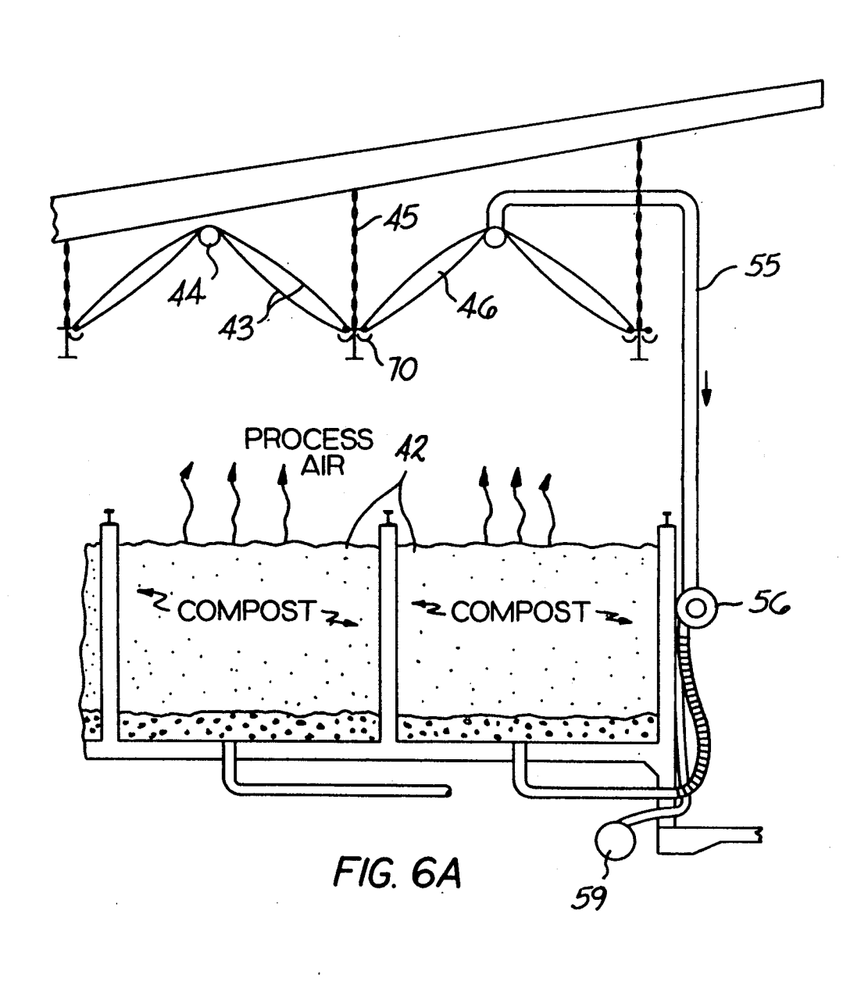
FIGS. 6A and 6B are end and side views respectively of the air hood as used in conjunction with curing channels.
Figure 6B:
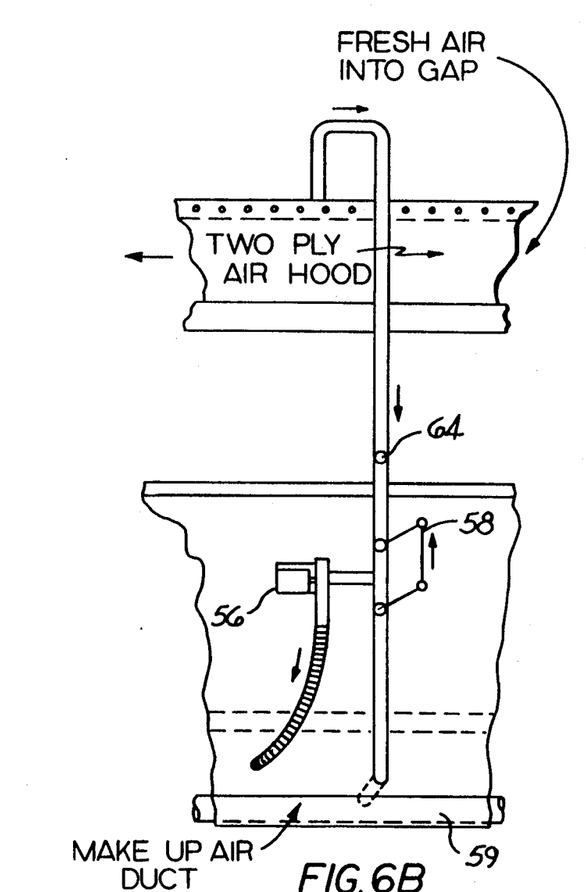

When it is desired to use dehumidified process air for recirculation through the compost pile an arrangement such as shown in FIGS. 6A and 6B can be used. A mixing valve 58 provides for the proper admixture of fresh air with dehumidified process air to be fed to the compost piles 42 based on oxygen content of the process air. When admixing occurs the air from the tipping area is drawn by blower 56 through air intake hoods 62 located in the ceiling of the tipping area and ductwork 59 for injection into and through the curing beds 42 along with the reconditioned process air. As this recirculated process air is reused in the curing process its oxygen content is monitored by means of an oxygen meter 64 positioned in the air stream. When the oxygen content reduces below a predetermined level the reconditioned process air is augmented by warmed outside air drawn from the tipping area. The desired mix of make up air and dehumidified process air is controlled by means of the mixing valve 58.

Warmed air passing through the air gaps 46 is used to heat the tipping area 10. As noted above, this air can later be drawn by blower 56 through air intake hoods 62 and ductwork 59 for injection into and through the curing beds 42. Alternatively the heated outside air can be admixed with reconditioned process air and fed to the curing beds by operation of valving 58, as conditions warrant. The sides of the tent-like structure are pitched so as to cause the moisture condensing on its surface to run in contact with its surface and not rain on underlying surfaces. Condensate gutters 70, as seen in FIG. 5, are provided at the nadir position of each of the tent structures to conduct away the condensate for use, as desired, within the facility. The hoods are maintained at their lower position in the saw-tooth configuration shown in FIGS. 3 and 5 by means such as PVC pipe 72, or other suitable material, disposed so as to cause runoff of condensate into gutters 70 which depend from the pipe. The process air as result of this arrangement is dehumidified and substantially deodorized. The conditioned process air can then be vented through a soil filter for further odor reduction or reused within the facility.

The process functions carried out in the curing area 14 are an important feature of any aeration system. As previously noted it is during the two week stay of the compost in the curing piles 42 that pathogen destruction is achieved. To accomplish this step of the process the temperature of the compost must be maintained within prescribed parameters. The compost must be kept at a point in excess of 55 degrees C. yet under approximately 65 degrees C. for a period of not less than 72 hours to achieve pathogen destruction and for the production of compost to be considered safe for handling and reuse. Makeup air for this critical stage of the process can be drawn from either or both of the air circulation systems described, either from air drawn from the tipping floor or from dehumidified process air.

In either event, air is supplied to the curing piles 42 by a a series of blowers 56 which force air into the compost through a network of perforated pipe underlying the curing beds. These blowers are controlled manually or by computer and are activated/deactivated based on pre-programmed parameters. When the temperature reaches a point outside the designated range, the blowers are activated to deliver the pre-conditioned air to and through the compost to lower the rising temperature. Once the temperatures have been returned to the optimal zone, the blowers are deactivated. This is a continuously occurring cycle, as the temperatures within the compost naturally increase when left unregulated. Monitoring of the temperatures within the individual aeration zones covered by the tent-like structure is achieved through use of thermocouples. The output of the thermocouples is fed to a control center which in turn regulates the operation of the blowers.

A prime benefit of the described system is that external, ambient air is preheated by heat generated by the composting process itself and used to heat the facility prior to its use in the composting process. The preferred system in cold climes is first to direct the warmed air to the tipping area. This helps heat the coolest area of the facility which is constantly being exposed to outside air. The air is then collected via air intakes located in the ceiling of the tipping area for distribution by ductwork to the curing area. In many geographic areas the ambient air is too cold for injection directly into the curing process. The introduction of cold outside air directly into the compost pile could damage many of the beneficial microbes while causing the blowers to have to be activated/deactivated at a much less regular rate. Also, the ambient air may not have the correct humidity or moisture levels, resulting in further variation of the warming/cooling cycle as well as the blower activation schedule. As air migrates through the six to eight feet of compost in the curing piles it becomes more humid. Being warmer, as this air exits the compost pile it naturally rises towards the building's ceiling where it is dehumidified upon contact with those air hood surfaces cooled by the outside air.

Figure 7:
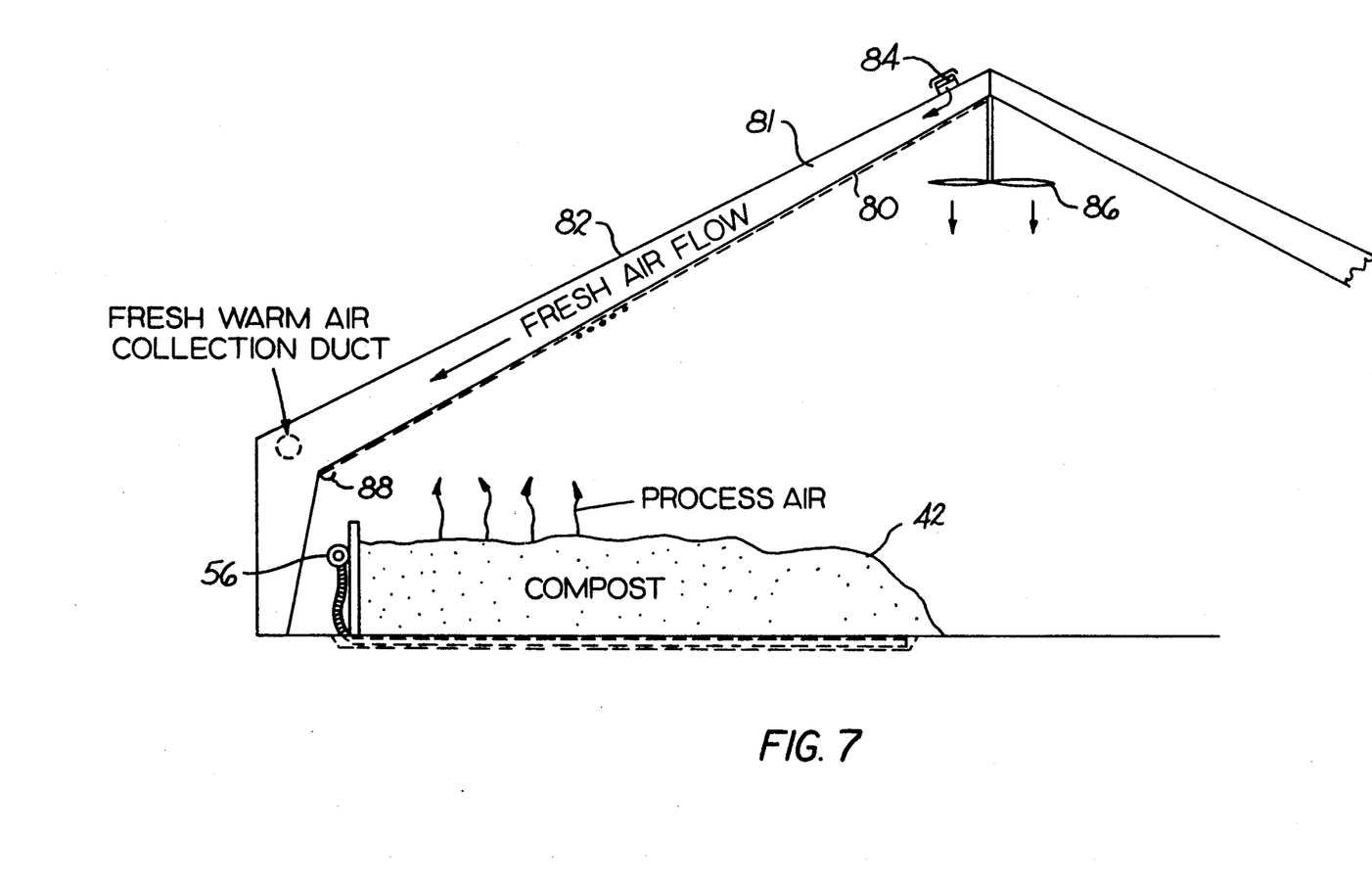
FIG. 7 illustrates an alternative embodiment in which the facility roof structure is used as the outer surface of the hood element of the system.

In FIG. 7 is shown an alternative embodiment illustrative of the scope of application of the subject invention. In this embodiment plastic sheathing 80 is applied to the undersurface of the roof beams to form an air plenum 81 between the roof deck 82 and the plastic underlayment 80. Fresh air intake blowers 84 located at the ridge of the roof draw air into the plenum. Air traversing the plenum is warmed by air emanating from the underlying compost piles undergoing curing. As a result of the heat exchange relation between these air streams occurring at the plastic interface 80, the process air is dehumidified and cooled and the ambient outside air is warmed. A down draft ceiling fan 86 circulates the dehumidified process air. Condensate is collected in gutter 88. It should be understood that the claimed process has particular application in those geographic areas in which injection of outside cold air into the curing piles would be highly deleterious to the curing process or result in an extreme cooling effect on the building environment. The heated air as a result of this heat exchange relation can then be used in heating areas of the facility or for controlled injection into the curing piles. If the air is to pass through the compost piles it is directed by suitable valving through a system of inground perforated piping which underlays the static compost pile or piles. The air which passes through the compost pile is heated as a result of the exothermic reaction of the biodegrading process. This air impinges on the under-surface of the plastic sheath and is cooled by the outside air passing along the outer surface of the sheathing. As the process air is cooled it gives up its moisture. The moisture in turn collects on the surface of the plastic and runs down the surface into gutters for proper disposition and use within the facility as desired. The air which has been dehumidified is recirculated within the facility for reuse in the system.

It will thus be seen that the described system results in heating the facility, dehumidifying and deodorizing the processed air, removing condensate and conditioning the outside air for use in internal processes of the system.

Air is directed by low horsepower blowers to the compost pile through ductwork disposed in channels formed in the concrete slab floor of the process building. The air is circulated from the aeration building ceiling by means of downdraft ceiling fans 86 for dispersion throughout the curing building. The floor channels are covered with a perforated grating upon which the compost is piled for further storage and curing. Air is blown through the channels and into the compost to insure that no anaerobic conditions occur. Compost is then stored for an additional period of time as prescribed by local regulations. Satisfying these regulations the compost is ready for a final screening and preparation for shipment. This final aeration step in the process achieves much the same effect as an external soil filter in that it filters air prior to its being released into the atmosphere.

To recap, the humidity and odor control, heating and air recovery system comprising this invention provides a multiplicity of advantages. External, cold ambient air is not required to be used in the composting process. In many geographic areas the ambient air is too cold for direct introduction into the compost pile and furthermore needs to be heated to maintain suitable working conditions within the facility. To inject cold air into the compost pile would damage many of the beneficial microbes. Additionally, process air which has passed through the compost pile is very humid and at an elevated temperature as a result of the exothermic reaction occurring within the pile. The air which heretofore has caused humidity problems is used to heat the incoming ambient air while at the same time undergoing dehumidification in the process. The condensate is collected and reused in the composting process. The air thus stripped of its moisture can then be beneficially reused in the system or passed through a soil filter for further deodorizing before release to the atmosphere.

The described system plays an important part in the overall process and produces benefits that are not realized in the use of non-preconditioned air drawn directly from outside the plant. Its integral role in the process results in a facility cured of moisture drippage problems, a highly energy efficient system, a superior end product and a process having little if any malodorous air effluents.

Having described the present preferred embodiments of my invention with reference to the appended drawings, it should be understood by those skilled in the art that various changes can be introduced without departing from the true spirit of the invention as defined in the appended claims.

I claim:

1. In a closed facility for the composting of solid waste and sewage sludge, a system comprising: a hood made of heat-conductive, moisture-impervious material disposed over a compost pile during active composting thereof; means for directing outside air over exteriorly presented surface portions of said hood to place the outside air in heat exchange relation with heated, moisture laden air emanating from the compost pile impinging on interiorly presented surface portions of said hood; gutter means for collecting condensate resulting from cooling of the impinging air and duct means for directing the heated outside air into the facility.

2. The system set forth in claim 1, wherein said hood is constructed of a sheet of polyethylene.

3. The system set forth in claim 2, wherein said hood is constructed of two sheets of material disposed to provide an air space therebetween.

4. The system set forth in claim 3, wherein said polyethylene material is suspended over the compost pile by one or more perforated ducts acting as ridgepoles.

5. The system set forth in claim 4, wherein said air ducts are constructed of polyvinyl chloride.

6. The system set forth in claim 4, wherein said perforated ducts act as air conduits for the collection of air emanating from said compost pile.

7. The air recovery system set forth in claim 6, including secondary duct means for recirculating collected air through said compost pile.

8. The system set forth in claim 4, including means for circulating air from outside said facility through said air space to provide a heat exchange relation between the circulating air and air emanating from said compost pile thereby heating the outside air and effecting condensation of moisture contained in air emanating from the compost pile.

9. The system set forth in claim 8, wherein the pitch of the duct-supported material is sufficient to provide non-drippage runoff to condensate.

10. The system set forth in claim 1, including secondary duct means for recirculating dehumidified air through the compost pile.

11. In a closed facility for the composting of solid waste and sewage sludge, a humidity control and heating system comprising: an air plenum formed between roof portions of said facility and a heat-conductive, moisture-impervious sheet of material underlying said roof portions; means for causing outside ambient air to traverse said plenum; a compost pile undergoing active composting disposed beneath said plenum; means for disbursing air through said compost pile such that air emanating from said compost pile impinges on confronting surface portions of said sheet of material thereby heating the ambient air traversing said plenum and dehumidifying the air impinging on said surface portions and duct means for directing heated outside air into the facility.

12. The system set forth in claim 11, wherein said heat-conductive material comprises a sheet of polyethylene.

13. The system set forth in claim 11, wherein said means for causing the air to traverse said plenum comprises an air recirculating blower.

14. The system set forth in claim 11 wherein said sheet of material is pitched to insure nondrippage runoff of moisture condensing on said sheet of material.

15. The system set forth in claim 14, including gutter means for collecting condensate.

16. The system set forth in claim 11, including secondary duct means for recirculating dehumidified air through the compost pile.

17. The system set forth in claim 11, including duct means for directing heated ambient air into the facility.

18. The system set forth in claim 17, including duct means for using said heated air in the composting process.

19. The air recovery system set forth in claim 11, including valve means for controlling the oxygen content of air being fed to the compost pile by admixing heated ambient air with dehumidified air.

* * * * *